Feb. 17, 1959  E. H. LAND ET AL  2,873,660
PHOTOGRAPHIC DEVICE FOR TREATING PHOTOGRAPHIC
PRINTS WITH A LIQUID
Filed March 15, 1957  5 Sheets-Sheet 3

INVENTORS
Edwin H. Land
BY Vaito K. Eloranta
Brown and Mikulka
Robert E. Corb
ATTORNEYS Feb. 17, 1959  E. H. LAND ET AL  2,873,660
PHOTOGRAPHIC DEVICE FOR TREATING PHOTOGRAPHIC
PRINTS WITH A LIQUID
Filed March 15, 1957  5 Sheets-Sheet 4

INVENTORS
Edwin H. Land
BY Vaito K. Eloranta
Brown and Mikulka
Robert E. Corb
ATTORNEYS Feb. 17, 1959

E. H. LAND ET AL 2,873,660

PHOTOGRAPHIC DEVICE FOR TREATING PHOTOGRAPHIC PRINTS WITH A LIQUID

Filed March 15, 1957

INVENTORS
Edwin H. Land
BY Vaito K. Eloranta
Brown and Mikulka
and
Robert E. Corb
ATTORNEYS

United States Patent Office 2,873,660
Patented Feb. 17, 1959

2,873,660

PHOTOGRAPHIC DEVICE FOR TREATING PHOTOGRAPHIC PRINTS WITH A LIQUID

Edwin H. Land, Cambridge, and Vaito K. Eloranta, Needham, Mass., assignors to Polaroid Corporation, Cambridge, Mass., a corporation of Delaware Application March 15, 1957, Serial No. 646,472

18 Claims. (Cl. 95—89)

This invention relates to photography and more particularly to novel photographic devices for treating photographic prints.

This application is a continuation-in-part of our copending application Serial No. 555,461, filed December 27, 1955, now abandoned.

In copending application Serial No. 555,433, filed December 27, 1955 in the name of Edwin H. Land et al., there is disclosed a method of treating a photographic print produced by silver transfer-reversal processes. The print as formed prior to treatment comprises a support sheet for a silver image and a water-soluble protective film of a plastic material formed during processing of the print. The print is treated by washing to remove any residual photographic reagents which may adversely affect the stability of the image or cause discoloration of the image highlights upon reaction with oxygen in the atmosphere. It is desirable to maintain the plastic film on the print for protecting the image and accordingly the washing liquid may comprise, in addition to water, a water-miscible organic liquid (nonsolvent for the plastic) for preventing dissolution of the plastic film, together with an agent adapted to harden the plastic film and make it more water insoluble, as by cross linking. In this method of treatment, the photographic prints are preferably washed by being completely immersed in the liquid for about a second or more and are then withdrawn and allowed to dry.

Photographic prints of the type requiring the above described treatment may be produced directly in a handheld camera and it is desirable that the print produced therein be treated by the above method as soon as possible after its formation. Accordingly, objects of the invention are: to provide a photographic device adapted to be carried on or about the person and containing a liquid in which a photographic print may be immersed for treating, e. g., by washing, said print; to provide a photographic device of the above type which can be readily closed so as to prevent leakage of its liquid contents and which is convenient and easy to open and employ for completely immersing a photographic print in said liquid; to provide a device of the above type into which a photographic print may be introduced for immersing said print in a treating liquid and adapted to remove excess liquid from the print during withdrawal thereof from the device; and to provide a device of the above type having a simple and compact structure and which is inexpensive to fabricate.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
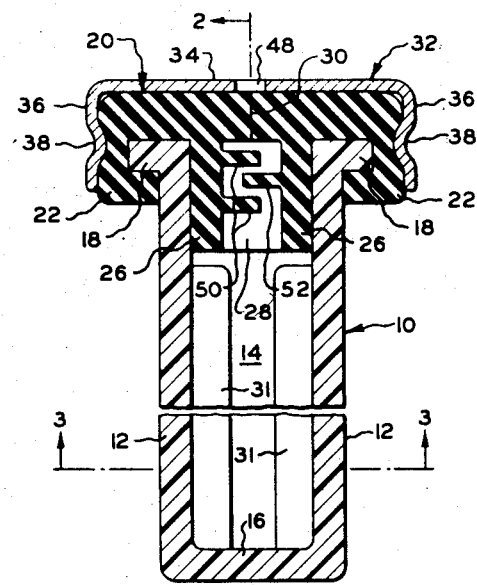
Figure 1 is a cross-sectional view of the device of the invention.
Figure 2:
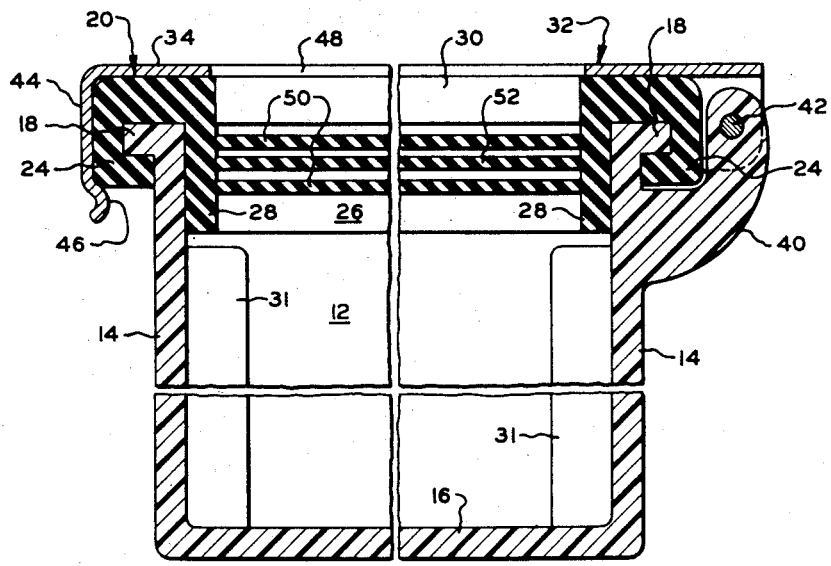
Fig. 2 is a cross-sectional view taken along the line 2—2 of Fig. 1.
Figure 3:
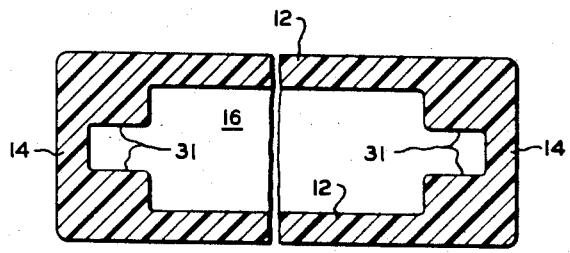
Fig. 3 is a cross-sectional view taken along the line 3—3 of Fig. 1.

Generally the device of the invention comprises a container for the washing liquid adapted to receive a photographic print, means for so closing the container as to prevent spilling and leakage of the liquid and to permit the container to be opened so that a print may be introduced without contacting the image surface thereof, and means for squeegeeing the liquid from the print as it is withdrawn from the container. The device is adapted to be carried by the operator and used in conjunction with a camera for immediately treating photographic prints produced in the camera and accordingly is preferably small and compact so that it may be carried conveniently on the person, and is of a simple and inexpensive construction which is easy to use.

In the form shown in Figs. 1 through 4, the device of the invention comprises a generally flat parallelepiped-shaped container open at one end and indicated at 10. Container 10 comprises rectangular side walls 12, slightly larger than the print to be treated, joined by relatively narrow end walls 14 and a bottom wall 16. Walls 12 and 14 of container 10 are formed at the open end of the container with outwardly flanged lips 18 to provide for added strength and rigidity and for retaining in place a closure element. Container 10 is formed preferably of a material having some flexibility and resiliency, such as plastic, rubber and the like, which will permit some deformation of the container but which will resume substantially its original shape when the deforming stress is relieved. The material of the container is also sufficiently transparent to permit the visual observation of the level of the liquid in the container.

The print-treating device of the invention includes a closure element, indicated at 20, adapted to extend across and into the open end of the container and to close the container. Closure element 20 is generally elongated and rectangular and includes angular dependent outer side walls 22 and outer end walls 24 extending exteriorly of flanged lips 18 for retaining closure element 20 in closing relation to the open end of container 10. Closure element 20 is formed preferably of a substantially elastic material and is so constructed that dependent walls 22 and 24 must be stretched in order to assemble element 20 with container 10. The closure element also includes inner dependent side walls 26 and end walls 28 extending inside container 10 in contact with, respectively, side walls 12 and end walls 14 so as to form a substantially liquid-tight joint between the container and closure element. In order to permit the introduction of a photographic print, indicated schematically at 29, into container 10, closure element 20 is formed with a longitudinal slit 30 slightly greater in length than the width of the photographic print to be introduced and extending between inner end walls 28 completely through element 20. Slit 30 is normally closed and is held in this closed position by the resiliency of the side walls of the container in the region of the open end and lips 18, thus preventing spillage or leakage of the liquid contents of the container.

To insure retention of slit 30 in a closed position, regardless of the conditions of handling of the container, there is provided a retaining element generally indicated at 32. Retaining element 32 comprises a substantially rigid, elongated, channel-shaped member having a base 34 and sides 36. Retaining element 32 may be located in closed position with base 34 in contact with the upper surface of closure element 20 and with sides 36 extending around outer side walls 22 of the closure element so as to compress the closure element slightly. To insure retention of retaining element 32 in closed position, sides 36 thereof may be provided with longitudinal indented sections 38 adapted to increase the gripping effect on the sides of closure element 20 as well as to increase the rigidity of the walls. Retaining element 32 is pivotally secured to container 10 and for this purpose container 10 is provided on one end wall with an upwardly extending curved bracket 40 at which retaining element 32 is mounted at one end by such means as a pin 42 extending through the bracket and through sides 36. Retaining element 32 is also provided, at its end opposite from bracket 40, with an end wall 44 which may have an inwardly curved edge 46 adapted to extend around the lower corner of outer end wall 24 of closure element 20 to aid in securing retaining element 32 in the above-described position.

Figure 4:
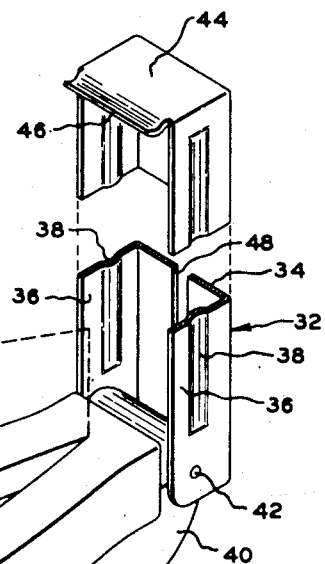
Fig. 4 is a perspective view, partially in section, of the device of Fig. 1 illustrating the operation of said device.
Figure 4:
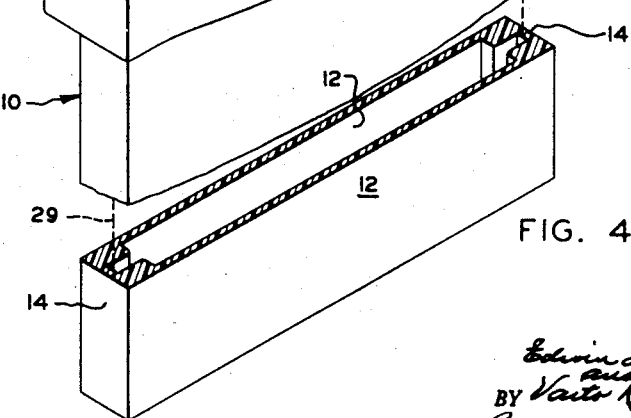

The walls of container 10 adjacent the opening therein and closure element 20 are so formed that when compressive pressure is applied to end walls 14 of the container in the region of the open end, side walls 12 bow or bulge outwardly, causing the sides of slit 30 to be spread apart as shown in Fig. 4. In this position the slit is widest at the center, tapering toward its ends so as to allow for the introduction of a photographic print and, as the print is introduced into the container through the slit, its margins are engaged by the sides of the slit adjacent each end thereof so as to guide the print into the container. By virtue of this construction, the portion of the print lying between the margins and carrying the image is prevented from contacting the sides of the slit and thereby being scratched or marred prior to immersion in the liquid. Parallel guide tracks 31 adapted to engage the margins of the print may be provided on the end walls 14 of the container to prevent the print from contacting side walls 12 of the container. The relative shapes and proportions of the print and container are preferably such that when the leading edge of the print is in contact with lower wall 16, a short tapered end section of the print extends through slit 30 above closure element 20 and may be grasped for withdrawing the print from the container.

The fluid in the container preferably comprises water, a water-miscible organic liquid and a cross-linking agent such as a salt and is of the type disclosed in the above-mentioned application. This liquid is provided in the container in a quantity normally insufficient to completely fill the container but preferably sufficient to fill the container, or at least completely cover the portion of the print in the region of the image, when the print is introduced and/or when side walls 12 of the container are compressed toward one another. When a print is in position for washing in the container, the compressive pressure on end walls 14 is released, allowing the sides of slit 30 to close upon the print to form a liquid-tight seal. To insure the liquid-tightness of this seal, retaining element 32, which must be pivoted from engagement with closure element 20 to an open position (as shown in Fig. 4) in order to allow the spreading of slit 30 and the introduction of a print, may be pivoted to a closed position (Figs. 1 and 2) in engagement with element 20. For this purpose, base 34 of element 32 is provided with a longitudinal slot 48 through which the end of a print may project and through which the print may be withdrawn. When retaining element 32 is in closed position and sealing of the container is assured, the container may be shaken to agitate the liquid and thereby increase its washing action on a print positioned within the container.

Figure 8:
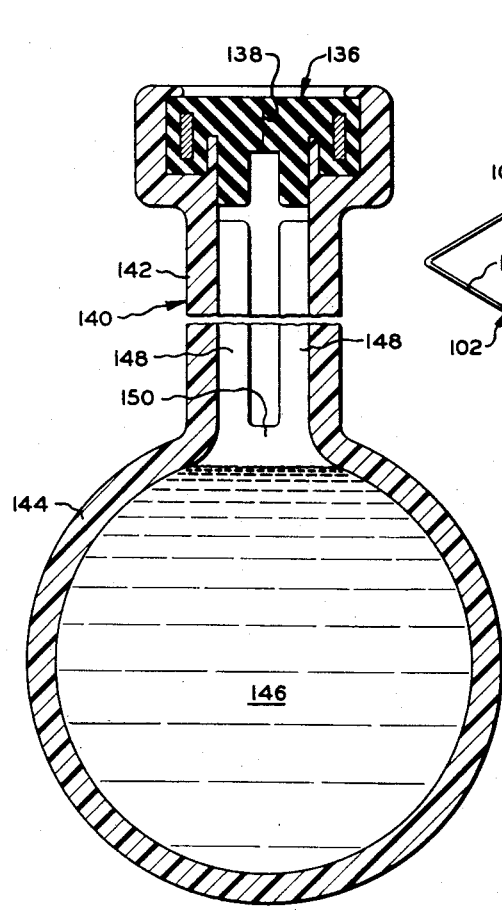

In accordance with the invention, closure element 20 includes a form of squeegee for removing excess liquid from a print as it is withdrawn from the container following treatment, preferably in such a way that the surfaces of the treated print are tactually dry. This squeegee comprises a pair of rectangular cross-sectioned lips or flanges 50 extending from one inner dependent side wall 26 toward the opposite side wall and a corresponding flange 52 extending from said opposite side wall toward the first-mentioned side wall between flanges 50. Flanges 50 and 52 extend from end to end of side walls 26 and project slightly more than half way across the passage between the walls so as to engage the surfaces of a print during withdrawal of the print from the container, but preferably so as not to engage the print when the slit is spread apart during introduction of the print. The flanges are formed at their free edges with substantially sharp square corners so that they act as a squeegee to insure removal of liquid from the print so that upon withdrawal from the container, the surfaces of the treated print are tactually dry. The closure element may be provided as shown in Fig. 8 without flanges 52, the sides of the slit acting as squeegees for removing excess liquid from the print.

Figure 5:
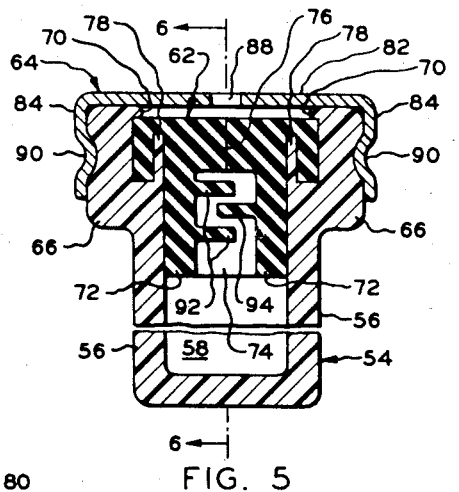
Fig. 5 is a view similar to Fig. 1 of another embodiment of the invention.
Figure 6:
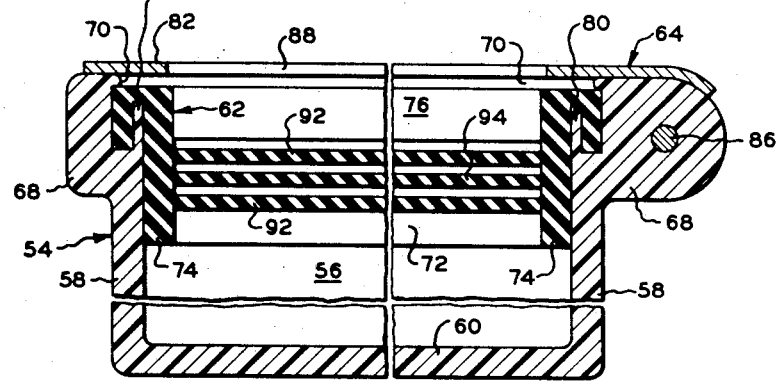
Fig. 6 is a view in cross section taken along the line 6—6 of Fig. 5.

Reference is now made to Figs. 5 and 6 of the drawings wherein there is illustrated another embodiment of the print-washing device. This embodiment is similar in construction and function to the device of Figs. 1 through 4 and includes an open container 54 comprising side walls 56, end walls 58 and a bottom wall 60, a flexible closure element 62 and a channel-shaped retaining element 64. Side walls 56 and end walls 58 of container 54 are provided, respectively, adjacent the opening of the container with outwardly projecting L-shaped extended sections 66 and 68, said sections being adapted to extend around and provide a seal for closure element 62. Closure element 62 is positioned between extended sections 66 and 68, each of said sections being provided with a small inwardly extending bead or ridge 70 at its end edge for assuring retention of element 62. Closure element 62 also includes dependent side walls 72 and end walls 74 extending into the container adjacent, respectively, side walls 56 and end walls 58 and is formed with a longitudinal slit 76 extending between dependent end walls 74.

Slit 76 is normally retained in a closed position due to the tendency of extended sections 66 on opposite sides of a closure element 62 to compress the closure element. The sides of the slit are adapted to separate to form an opening permitting the introduction of a photographic print when compressive pressure is applied to extended sections 68, causing extended sections 66 and side walls 56 to be bowed or bulged outwardly. Spreading of the sides of the slit in response to the outward bulging of the side walls and extended sections may be assured by securing the sides of the closure element thereto or preferably by providing each of side walls 56 with a narrow ridge 78 adapted to extend into a matching channeled groove or recess in the closure element adjacent each dependent wall 72. Ridges 78 also function to help form a liquid-tight seal between the container and the closure element and for this reason similar ridges 80 may be formed on end walls 58 and are adapted to engage corresponding grooves in the ends of closure element 62.

Retaining element 64 includes a base section 82 and dependent sides 84 extending on opposite sides of and in engagement with extended sections 66 so as to exert a slight compressive pressure on said sections and assure retention of slit 76 in a closed or liquid-tight condition. One of extended sections 68 is enlarged for pivotally mounting retaining element 64 on a pivot pin 86 extending through the extended section 68. Base section 82 of element 64 is provided with a longitudinal slot 88 permitting the withdrawal of a print from the container when element 64 is in closed position (as shown in the drawings) and sides 84 are provided with indented sections 90 adapted to engage corresponding recesses or indentations in extended sections 66 for securing retaining element 64 in closed position. Retaining element 64 may be employed only for holding the sides of the slit in a closed or liquid-sealed condition even with a print extending from the container when the latter is in an inverted position. Element 64 may be so constructed as to act as a cap or cover to provide additional sealing of the container.

As a means for squeegeeing excess liquid from photographic prints as they are withdrawn from the container through the slit between dependent side walls 72, one of the side walls is provided with a pair of projecting ridges or flanges 92 and the opposite side wall includes a ridge or flange 94 projecting toward the first-mentioned side wall between ridges 92. The container of the device may be provided, if desired, with a series of flexible projecting ridges or squeegee elements extending along both side walls substantially completely to the bottom of the container.

In the form of washing device shown and described above, the slit in the closure element is retained in a closed position by either or both the resistance to deformation and tendency to resume its normal configuration of the container, and the retaining element. However, in other forms of the device falling within the scope of the invention, the upper section of the container including the closure element may be so constructed that the slit normally assumes an open position, and other means such as resilient members or springs may be provided for holding the slit in the closure either in a closed liquid-tight condition or an open position, or additional liquid-sealing means may be provided in the form of flexible lips on opposite sides of the slit. These lips may be adapted to be held in a closed position in engagement with one another by atmospheric pressure, this being readily accomplished by slightly pressing together the sides of the container and then releasing the sides, which have a tendency to expand outward and resume their original shape, thereby reducing the pressure within the container.

Figure 7:
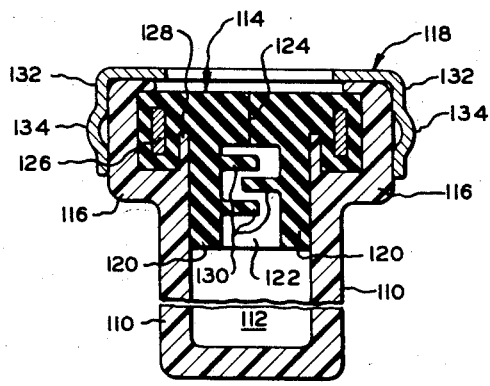
Figs. 7 and 8 are views, similar to Fig. 1, of still other embodiments of the invention.

The embodiment of the print-washing device shown in Fig. 7 is similar in construction and function to the device of Figs. 5 and 6 and includes a container comprising side walls 110 and end walls 112, a flexible closure element 114 positioned between outwardly projecting L-shaped extended sections 116 of side walls 110, and a channel-shaped retaining element or cover 118. Closure element 114 includes dependent side walls 120 and end walls 122 extending into the container and is provided with a longitudinal slit 124 extending substantially midway between its sides. Closure element 114 is formed preferably by molding and includes a pair of elongated springs 126 extending within the element substantially from end to end along opposite sides of slit 124, the closure element being formed with springs 126 held substantially straight. Springs 126 may be bowed or biased inwardly toward one another so as to normally urge the sides of slit 124 into closed position, or the springs may preferably be bowed outward so as to hold the slit in an open position permitting the introduction of a photographic print into the container.

In this form of the device, side walls 110 are provided with upwardly extended sections 128 which project into recesses in closure element 114, helping to form a liquid-tight seal between the closure element and the walls of the container and assuring the outward flexing or bulging of the side walls of the container under the bias of springs 126. Dependent side walls 120 of the closure element are provided with opposed projecting lips or flanges 130 adapted to act as a squeegee. The sides of slit 124 and side walls 120 are normally held apart by springs 126 sufficiently to permit the introduction of a film unit into the container without contact between the image surface of the print and either the sides of the slit or flanges 130. During withdrawal of a print from the container, the operator need only compress the sides of the container slightly to close the slit sufficiently to cause the squeegee flanges to engage the print and remove excess liquid therefrom. When the washing device is not in use, the sides of the slit are retained in a closed liquid-tight condition by retaining element 118. The retaining element includes a pair of side walls 132 adapted to extend in engagement with L-shaped extended sections 116, compressing the latter slightly so as to retain the slit in a closed position. Longitudinal stressing ribs 134 may be provided in side walls 132 to lend rigidity thereto and element 118 is preferably pivotally mounted adjacent one end, for example, by a pair of stub shafts formed on extended sections 116 and projecting into holes in walls 132.

In the form of print-washing device shown in Fig. 8, closure element 136 is provided without flanges or lips to act as a sequeegee; instead, the inner edges of the element defining slit 138 are adapted to act as a squeegee for removing excess liquid from photographic prints. The container of the device is indicated at 140 and includes a rectangular upper section 142 adapted to receive a photographic print and an enlarged lower section 144 which acts as a reservoir containing a quantity of washing liquid 146 sufficient to fill the upper section when the container is inverted with a print positioned for washing within the upper section. Pairs of guide members or ribs 148 are provided on side walls of the container in position to engage the margins of the print and prevent contact of the image with the side walls. Connecting members 150 are provided between the lower portions of ribs 148 just above the level of the liquid in the enlarged lower section to prevent movement of a print into the liquid. In using this form of device, a photographic print is introduced into the empty upper section of the container, the sides of the slit are closed to form a liquid-tight seal and the container is inverted so that the print is completely immersed in the liquid. Following washing of the print, the container is returned to an upright position so that the liquid collects in the bottom section and the print may be withdrawn from the container. This arrangement prevents the accumulation of any residue from the liquid on the walls of the container in the region adapted to contain a photographic print as the amount or level of the liquid decreases during use and due to evaporation, and prevents the formation of lines or marks on the print as a result of one part of the print being immersed in the liquid longer than another. In addition, the physical shape and dimensions of the container may be such that the fluid contents of the reservoir will not spill from the container even when the container is open and lying on its side.

Figure 12:
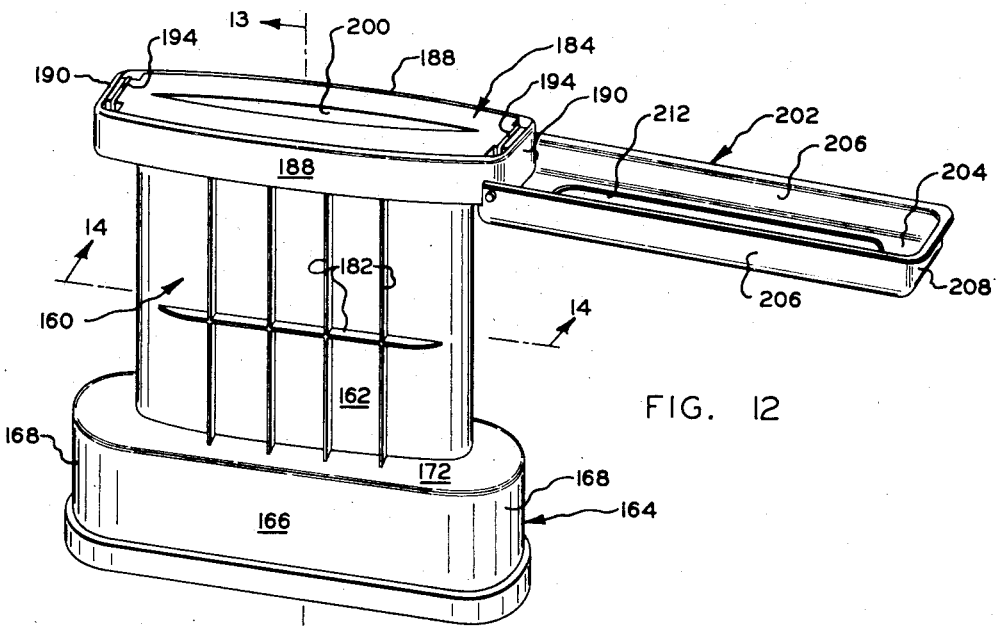
Fig. 12 is a perspective view of another form of device embodying the invention.
Figures 13, 14:
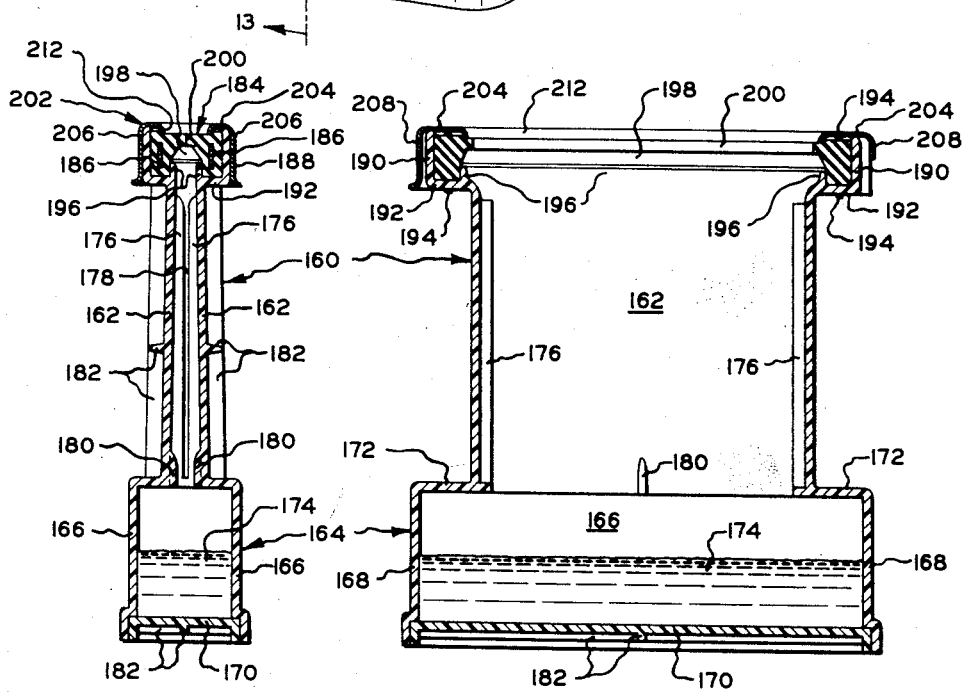
Fig. 13 is a sectional view of the device of Fig. 12 taken through a plane designated 13—13.
Fig. 14 is a sectional view of the device of Fig. 12 taken through a plane designated 14—14.

Another embodiment of the print washing and treating device is shown in Figs. 12 through 14 of the drawings. The container of the device comprises an upper print-receiving section 160 having side walls 162 positioned relatively close to one another and adapted to receive a photographic print therebetween, and a lower reservoir section 164 having a generally rectangular vertical cross section and including side walls 166, curved end walls 168, a bottom wall 170 and relatively short upper walls 172 extending outward from the lower portions of side walls 162. Reservoir section 164 is of a substantially lesser depth than print-receiving section 160 while its width and length dimensions exceed those of the print-receiving sheet, so that the volume of the reservoir section is at least equal to that of the print-receiving section and will contain at least a sufficient quantity of a liquid 174 to completely fill the print-receiving section when the container is inverted with a print located within the print-receiving section.

Pairs of inwardly projecting lips or tracks 176 are provided on side walls 162 and form guide channels 178 adapted to receive and engage the margins of a print for supporting the print within print-receiving section 160 without contact with side walls 162. Lips 176 join one another at their lower ends so as to provide an end for each of channels 178 which functions as a stop for properly locating the print within the print-receiving section and preventing its being introduced into reservoir section 164. Another pair of relatively short projecting members or lips 180 are provided on side walls 162 adjacent the lower edges and intermediate their sides for engaging the lower margins of the print to aid in preventing contact between the print surfaces and side walls 162. Reinforcing lips 182 are provided on the outer surfaces of side walls 162 and bottom wall 170 for lending support and rigidity to these walls.

The closure element, designated 184, of this device is similar in many respects to the form of closure element shown in Fig. 8, being formed preferably of molded rubber and being elongated and generally parallelepiped in shape. A pair of elongated springs 186, biased so as to normally assume bowed or arched-apart positions, are provided within the element and extend from end to end thereof. The closure element is retained in an open recess provided by side walls 188, end walls 190 and outwardly projecting bottom walls 192 on the upper portions of print-receiving section 160. This recess is considerably larger in its horizontal dimensions than print-receiving section 160 so that it projects outwardly therefrom on all sides, and the side and end walls of the recess are formed so that said walls snugly engage the sides and ends of closure element 184. Means such as staples 194 are provided secured around the ends of element 184 and projecting through the end sections of lower walls 192 for retaining the closure element in the recess between side walls 188 and end walls 190.

Side walls 162, which are curved at their edge portions so that they join one another, extend upwardly into the aforementioned recess above lower walls 192 to provide a lip 196 which projects into a recess 198 in the lower portion of closure element 184, it being noted that in this embodiment the closure element does not include portions which project into the container itself. Portions of closure element 184 surrounding recess 198 are snugly engaged around lip 196 between the latter and side walls 188 and end walls 190 so as to form a liquid-tight seal between the closure element and the container. In this regard a small deformable inwardly projecting lip or flange (not shown) may be provided around the lower edge of recess 198 in closure element 184 for engaging lip 196 to form a preferably liquid- and air-tight seal. The portion of closure element 184 overlying recess 198 is provided with an elongated slit 200 the sides of which are normally bowed apart by springs 186 to provide an opening permitting the introduction of a print into the device through the closure element without contact between the surfaces of the print and the sides of slit 200. The lower edges of corners of the slit are quite sharp and well defined so that, when the sides of the slit are held against the surfaces of a print, the edges act as a squeegee for removing liquids from the print surfaces as the print is withdrawn from the container.

The device includes retaining means for holding the sides of slit 200 in closure element 184 together so as to seal the container with or without a print located within the print-receiving section thereof and extending therefrom and to cause the sides of the slit to function as a squeegee during withdrawal of a print therebetween. The retaining means comprises a retaining element 202 similar in most respects to the retaining element shown in Figs. 1 and 2 of the drawings. Retaining element 202 includes an upper wall 204 and dependent side walls 206 and end walls 208 adapted to fit around and compressively engage side walls 188 and end walls 190 of the container. Retaining element 202 is mounted for pivotal movement adjacent one end on the container by a pair of stub shafts or projections 210 formed integrally with side walls 188 and engaged in holes in side walls 206. Retaining element 202 is pivotable from a closed position shown in Figs. 13 and 14, wherein side walls 206 of the retaining element compressively engage side walls 188 of the container so as to hold together the sides of slit 200, and an open position to one side of the container as shown in Fig. 12. Side walls 206 and end walls 208 are flanged outwardly at their lower edges so as to facilitate movement of the retaining element into closed position. The retaining element includes an elongated slot 212 in upper wall 204 at least equal in length to slit 200 whereby a print may be withdrawn from the container through slit 200 and slot 212 when retaining element 202 is in closed position. The edges of slot 212 are bent slightly downwardly so as to engage the upper surface of closure element 184 in the region of slit 200, aiding in properly locating the sides of the slit relative to one another during withdrawal of a print from the container.

By virtue of the construction shown, the device containing a liquid for treating prints may be carried about in the pocket and subjected to considerable abuse without being damaged or without danger of spilling the liquid; yet the device can be readily employed for treating a print by merely pivoting the retaining element to an open position, allowing the sides of slit 200 to open under the bias of springs 186. The device is employed in its upright position shown by introducing the print through the spread-apart sides of slit 200 into print-receiving section 160 until the print comes to rest with a portion thereof projecting above closure element 184. The retaining element is then moved to closed position and the device is inverted for rapidly immersing the print in the treating liquid. The sides of slit 200 closely engage the surfaces of the print, preventing the liquid from escaping from the container when it is in its inverted position and the print may be withdrawn from the container, the sides of the slit acting as a squeegee to remove the liquid from the surface of the print either while the container is in inverted position, or after the container has been returned to its upright position.

Figure 9:
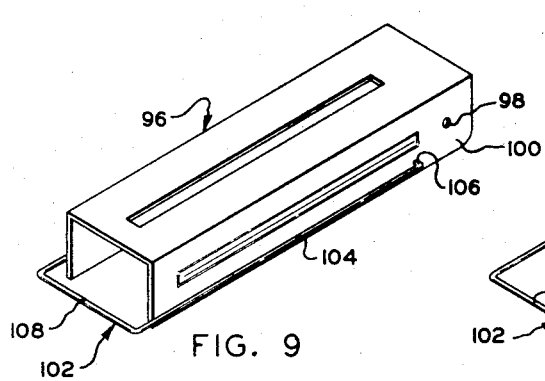
Figs. 9, 10 and 11 are perspective views of components of the invention showing the components in different positions to illustrate their operation.

The print-washing device may also include means coupled with the retaining element for applying compressive pressure to the ends of the container for spreading apart the sides of the slit in the closure element. For example, in the form shown in Figs. 9 through 11, channel-shaped retaining element 96 is pivotable about a pin extending through holes 98 located in the sides 100 of the element adjacent one end thereof and has three operative positions illustrated in each of the above-mentioned figures. In its closed position (Fig. 9) the sides of the retaining element apply compressive pressure to the sides of the container and closure element to hold the sides of the slit in a sealed or liquid-tight position. An elongated U-shaped bail or loop 102 is provided in combination with element 96 for applying compressive pressure to the ends of the container for spreading apart the sides of the slit. Bail 102 includes a pair of elongated legs 104 pivotally secured at their ends 106 in the sides 100 of element 96 adjacent the lower edge of the sides and more remote from the ends of element 96 than holes 98. Legs 104 extend along opposite sides of the container and are connected at their other ends by a bight portion 108 engaging the container in the region of the opening at the end opposite the pivotal mounting for the retaining element. The lengths of legs 104 are such that when the retaining element is in a closed position as shown no compressive pressure is applied to the ends of the container.

Figure 10:
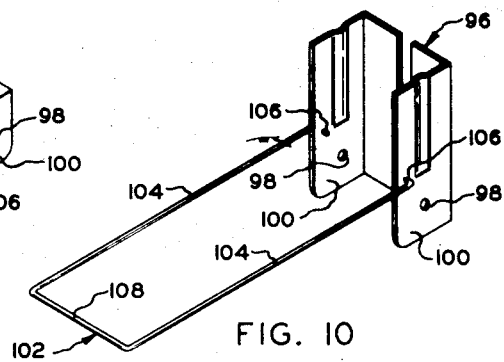
Figure 11:
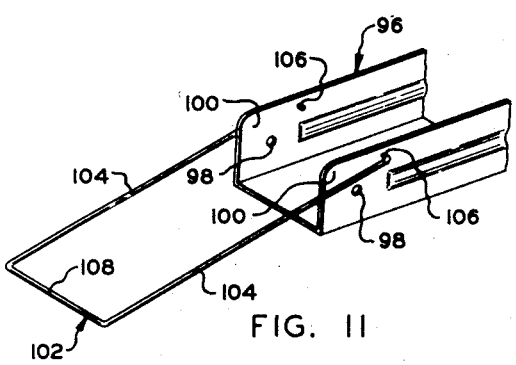

Retaining element 96 is pivotable from its closed position through approximately 180° to a full open position shown in Fig. 11. In this position bail 102, attached to element 96, is moved in the direction of rotation of the element or toward the end at which the element is mounted and the bight portion thereof applies compressive pressure to the ends of the container, causing the walls thereof to be bowed outwardly and the sides of the slit in the closure element to be spread apart to an open position at which a photographic print may be introduced without contacting either the sides of the slit or the squeegee formed by portions of the closure element. It is desirable to provide for an intermediate position of the closure element wherein the sides of the slit are spread apart slightly so that they do not tightly engage a photographic print so as to allow for the withdrawal of the print, and the squeegees are held in contact with the print surfaces. Accordingly, retaining element 96 is pivotable to a half-open position substantially midway between the closed and full open positions as illustrated in Fig. 10. In this half-open position the compressive pressure applied to the container by bail 102 is sufficient to cause only a slight spreading of the sides of the slit so that the sides thereof do not engage the print in a liquid-tight manner.

In the operation of this form of the device, the retaining element is pivoted through approximately 180° from its closed position to a full open position to allow for the introduction of a photographic print without contact of the image surface of the print with either the sides of the slit or the squeegees. Retaining element 96 is then pivoted to a closed position, causing the sides of the slit to engage the print in a liquid-tight manner to allow the container to be shaken or inverted if desired without spilling the liquid. The retaining element is then pivoted to its half-open position to allow for the withdrawal of the print from the container and the squeegeeing of liquid from the print, and then may be returned to its closed position for retaining the slit liquid tight so that the washing device may be carried without danger of spillage or leakage of its liquid contents.

Further modifications of the herein disclosed device may suggest themselves and are considered to fall within the scope of the invention. For example, the arrangement of the closure element and resilient means for holding the element in closed position may be such that when the slit therein is in an open position the sides of the slit are generally parallel rather than convergent toward their ends. With this arrangement of the closure element, the guide means within the container which engage the edges of a print will function to prevent the image surface of the print from contacting the sides of the slit in the closure element.

The present invention thus provides a novel device containing a fluid and of a size and shape which makes it convenient to store and carry, for example, in the pocket of the user. The device is so constructed as to prevent spillage or leakage of the fluid regardless of its position while making the fluid readily accessible for treating photographic prints. While the device is particularly adapted to the treatment (including washing) of a photographic print produced by a transfer process, it may also find utility, for example, in the treatment of photosensitive sheet material with a liquid or vapor carried within the container of the device.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic device for containing a liquid and treating photographic sheet materials with said liquid, said device comprising, in combination, a container having a first section for holding a photographic sheet and containing a liquid in sufficient quantity to completely immerse the portion of said sheet held in said first section, and a second section providing an opening in said container through which said photographic sheet may be introduced into said first section, a flexible closure element secured in said opening between portions of said second section and having an elongated slit through which a photographic sheet may be introduced into said container, portions of said closure element comprising the sides of said slit being deformable between an open position wherein said sides of said slit are bowed apart to form an elongated opening tapering toward its ends for guiding said sheet into said container without contacting the surfaces of said sheet intermediate its margins, and a closed position wherein the sides of said slit are in close contact with one another to form a tight seal, resilient means coupled with said closure element for urging said sides of said slit into one of said open and closed positions, and retaining means for engaging said second section and retaining said slit in closed position.

2. The photographic device of claim 1 wherein said retaining means comprises a cap adapted to extend in surrounding engagement with said second section of said container and across said closure element, said cap being mounted on said second section for pivotal movement between an open position to one side of said closure element and a closed position wherein it engages said second section for urging said sides of said slit toward one another into closed position, said cap including an elongated slot overlying said slit and through which a photographic sheet can be withdrawn from said container with said cap in closed position.

3. The photographic device of claim 1 wherein said resilient means is so constructed as to urge said slit into open position with said sides thereof bowed apart.

4. The photographic device of claim 1 wherein portions of said closure element disposed on opposite sides of said slit comprise squeegees for removing liquid from the surfaces of said sheet during withdrawal of said sheet from said container.

5. The photographic device of claim 1 wherein said closure element is formed of an elastic material and said resilient means comprises a pair of elongated oppositely curved spring members embedded in said closure element on opposite sides of said slit.

6. The photographic device of claim 1 wherein said resilient means comprises portions of said second section of said container engaged with portions of said closure element on opposite sides of said slit.

7. The photographic device of claim 1 wherein said first section includes a sheet-receiving portion having front and rear walls spaced relatively close to one another and of such dimensions as to receive a photographic sheet of predetermined size, and a reservoir section of substantially lesser depth than said sheet-receiving portion, the walls of said reservoir section being spaced apart sufficiently to provide a volume at least equal to the volume of said sheet-receiving portion.

8. A photographic product comprising the device of claim 1 and containing a liquid reagent comprising water, a water-miscible organic solvent and a cross-linking agent for plastic materials and provided in a quantity at least sufficient to completely immerse a photographic sheet located within said first section.

9. A photographic device for treating photographic prints with a liquid, said device comprising, in combination, a container having a liquid-holding section and a closure section, said liquid-holding section being adapted to receive a photographic print and containing a quantity of treating liquid, a closure element secured in said closure section and including an elongated slit and being deformable between an open position wherein said slit defines a passage through said closure element adapted to receive a photographic print and a closed position wherein said container is sealed, resilient means for flexing said closure element into said open position, and retaining means for engaging the sides of said closure section and acting against the flexure of said resilient means so as to retain said slit in said closure element in closed position.

10. A photographic device for treating photographic prints with a liquid, said device comprising, in combination, a container having a liquid-holding section and a closure section, said liquid-holding section being adapted to receive a photographic print and containing a quantity of treating liquid, a flexible closure element secured in said closure section and having formed therein an elongated slit, said closure element being deformable between an open position wherein the sides of said slit are spaced apart to provide an opening through said closure element and a closed position wherein the sides of said slit contact one another to form a seal, the sides of said closure section being sufficiently deformable to permit their being spread apart sufficiently to permit said slit to be opened and provide an elongated opening through which a print may be introduced into said liquid-holding section of said container, resilient means for flexing apart the sides of said slit, and retaining means for engaging the sides of said closure section and acting against the flexure of said resilient means so as to retain said slit in closed position.

11. A device for treating a photographic print with a liquid and for removing excess liquid from said print following treatment, said device comprising, in combination, a deformable open-mouthed container adapted to receive a photographic print to be treated, a quantity of liquid in said container for treating said print, said container having an elongated open mouth, an elongated flexible closure element in said mouth, portions of said container in the region of said mouth cooperating with portions of said closure for retaining said closure on said container in said mouth and forming a liquid-tight seal between said container and said closure, said container comprising a pair of side walls joined at their edges by a pair of relatively narrow end walls, the side walls of said container being so constructed as to bulge outwardly in response to application of compressive pressure on said end walls, said closure having a longitudinal slit intermediate its sides and extending substantially parallel with said side walls, said closure being so coupled with said side walls that the sides of said slit are spread apart to an open position by outward bulging of said side walls, said slit in said open position providing an opening tapering toward its ends and permitting the introduction of a photographic print into said container, said slit having a closed position wherein the sides thereof form a liquid-tight seal, said closure including portions comprising a squeegee for engaging a print and removing liquid from the surfaces thereof during withdrawal of said print from said container, and means for urging the sides of said slit into closed position so as to prevent the leakage of said liquid from said container.

12. A photographic device for treating a photographic sheet with a liquid, said device comprising, in combination, a deformable open-mouthed container adapted to receive a sheet to be treated, a quantity of liquid in said container for treating said sheet and a flexible closure element for said container secured between walls thereof in the region of said open mouth, portions of said container cooperating with portions of said closure for retaining said closure in said container and forming a liquid-tight seal between said container and said closure element, said container comprising a pair of side walls joined along opposite edges by a pair of relatively narrow end walls, said side walls of said container being at least slightly deformable, said side walls in the region of said open mouth normally being substantially parallel and being so constructed as to bulge outwardly in response to the application of compressive pressure to said end walls, said closure having a longitudinal slit intermediate its sides and extending substantially parallel with said side walls, said closure element being so coupled with said side walls that the side walls of said slit are spread apart into an open position in response to the outward bulging of said side walls to provide an opening tapered toward its ends and permitting the introduction of a sheet into said container, said closure element comprising lateral portions extending into said container adjacent said side walls, said lateral portions comprising squeegees for engaging the surfaces of a sheet and removing liquid therefrom during withdrawal of said sheet from said container, and means including said side walls for urging said side walls toward one another so as to assume their parallel relationship upon the release of compressive pressure on said end walls for urging the sides of said slit into contact with one another to form a tight seal.

13. The photographic device of claim 12 including a retaining element secured to said container in engagement with said side walls in the region of said open mouth or urging said side walls toward one another and retaining the sides of said slit in contact with one another, said retaining element being movable between a first position wherein it engages said side walls and holds said slit in a closed position to a second position, out of engagement with said side walls and to one side of said open mouth, wherein it permits the spreading apart of the sides of said slit.

14. The photographic device of claim 13 wherein means are provided coupled with said retaining element for applying compressive pressure to said end walls of said container in response to movement of said retaining element into said second position.

15. The device of claim 12 wherein said container comprises an upper sheet-receiving section having generally parallel rectangular walls positioned relatively close to one another and adapted to receive therebetween the area of a photographic sheet to be treated, and a lower reservoir section containing a quantity of liquid when said device is in an upright position, the depth and width dimensions of said lower section being, respectively, less and more than the depth and width dimensions of said upper section whereby the volume of said lower reservoir section is at least equal to the volume of said upper sheet-receiving section whereby said liquid can be provided in said lower section in a quantity at least sufficient to completely immerse a photographic sheet located in said upper section when said device is in an inverted position at which said lower section is uppermost.

16. A closure for a container comprising an elongated generally parallelepiped-shaped closure element formed of an elastic deformable material, said element having an elongated longitudinal recess in one side and an elongated longitudinal slit in its opposite side communicating with said recess, said closure element being deformable between an open position wherein the sides of said slit are bowed apart and form an elongated opening tapered toward its ends and a closed position wherein the sides of said slit are in contact with one another and form a liquid-tight seal, and a pair of elongated resilient members embedded in said closure element on opposite sides of said recess and said slit, said resilient members being bowed in opposite directions for retaining said closure element in one of said open and closed positions.

17. The closure of claim 16 wherein said closure element is formed of rubber.

18. The closure of claim 16 wherein said resilient members are bowed apart intermediate their ends for retaining said closure element in said open position.

References Cited in the file of this patent

UNITED STATES PATENTS

| | | |
|---|---|---|
| 1,317,398 | Shiels | Sept. 30, 1919 |
| 2,353,769 | Stiffler | July 18, 1944 |